Patented Mar. 16, 1937

2,073,659

UNITED STATES PATENT OFFICE 2,073,659

MEDICINAL COMPOUNDS

Ernest K. Stratton, San Francisco, Calif.

No Drawing. Application December 13, 1933, Serial No. 702,261

3 Claims. (Cl. 167—55)

This invention relates to improvements in medicinal preparations, and pertains particularly to an elixir having digestive properties and designed to be used as a vehicle in which to dispense other medicines.

The primary object of the present invention is to provide a medicinal preparation containing digestive enzymes combined with a mint flavoring and a green coloring material of a character (a) to resist decomposition by the enzymes themselves, (b) to resist alkaline and acid reaction changes, and (c) to resist precipitation when bismuth salts are added.

With this in mind, attempts were made to color a digestive elixir green but it was found that the enzymes forming the principal ingredients digested some of the dyes experimented with, after a short period of time, and completely destroyed the green of the coloring material. The dyes which were not affected in this manner, however, were precipitated when bismuth salts (especially bismuth subcarbonate) were added and of these dyes whose coloring was not dissipated by the enzymatic action of the enzymes but which precipitated on addition of bismuth subcarbonate only one was stable enough when combined with acids and alkalies to be of any use in coloring a vehicle. The coloring employed being certified analine dyes F. C. F. (for coloring food).

As a result of experimentation it was found that a stable green coloring could be imparted to a preparation of this character by the combination of certain coloring elements, and that it could further be stabilized as a vehicle by adding a precipitation preventing chemical, which would prevent the precipitation of the coloring by the enzymes when mixed with such bismuth salts as are commonly employed and administered in digestive elixirs.

The preparation embodying the present invention consists of the following ingredients taken in the appended approximate proportions:—

| | |
|---|---|
| Pepsin U. S. P | 256 grains |
| Rennin | 64 grains |
| Papain | 32 grains |
| Lactic acid | 30 minims |
| Alcohol | 5 ounces |
| Glycerine | 8 ounces |
| Triethanolamine | 85 minims |
| Distilled water qa. ad | 32 ounces |
| Oil of spearmint | 15 minims |
| Talcum, purified | ½ ounce |
| Green dye solution (obtained as set forth below) | 15 minims |

The green coloring which has been developed, and which in the presence of triethanolamine, remains stable permanently in solutions of enzymes even when mixed with salts of the character above referred to, is prepared by mixing one part of a 3% aqueous solution of brilliant blue F. C. F. and two parts of a 3% aqueous solution of tartrazine F. C. F.

In combining the present elixir the pepsin, rennin and papain are dissolved in twelve ounces of water, to which the lactic acid has been added, after which the glycerine and alcohol are added and finally sufficient distilled water to make thirty-two ounces. The spearmint flavor is imparted to the solution by rubbing the oil of spearmint in a mortar with the talcum powder and then thoroughly mixing this with the preparation. After thorough mixture of the oil carrying talcum with the preparation the same is filtered and then has the dye and triethanolamine added thereto.

As a result of extensive experimentation it was determined that the power of the enzymes, particularly the pepsin and rennin, to precipitate the color of the dye solution employed when mixed with certain bismuth salts could be inhibited by the addition of triethanolamine. Further experiment disclosed that the triethanolamine when added in the proportion of approximately one-third of the amount of pepsin employed is best suited for preventing this precipitation of the color.

It is of course, to be understood that other ethanolamines may be employed satisfactorily but triethanolamine is preferred.

Having thus described my invention, what I claim is:—

1. A liquid medicinal preparation including pepsin, rennin and papain, and a green color imparting dye which remains unaffected by these enzymes, and which comprises a combination of benzyl ethyl aniline sulphonic acid benzylaldehyde ortho sulphonic acid, and phenyl hydrazine-P.-sulphonic acid dioxytartaric acid.

2. A liquid medicinal preparation comprising digestive enzymes including pepsin, and a green color imparting dye, capable of resisting discoloration in the presence of said digestive enzymes and in the presence of proper, that is, prescribed proportions, of those acids and alkalies which are susceptible for use in internal medication, said dye comprising a combination of benzyl ethyl aniline sulphonic acid benzylaldehyde ortho sulphonic acid, and phenyl hydrazine-P.-sulphonic acid dioxytartaric acid.

3. A liquid medicinal preparation including the enzymes pepsin, rennin and papain together with bismuth salts; and the green color imparting dyes, benzyl ethyl aniline sulphonic acid benzylaldehyde ortho sulphonic acid and phenyl hydrazine-P.-sulphonic acid dioxytartaric acid; and an ethanolamine capable of preventing the precipitation of the dye in the presence of the enzymes and bismuth salts.

ERNEST K. STRATTON.